United States Patent
Markunas et al.

(10) Patent No.: US 8,593,095 B2
(45) Date of Patent: Nov. 26, 2013

(54) WOUND FIELD SYNCHRONOUS MACHINE ROTOR TRACKING USING A CARRIER INJECTION SENSORLESS SIGNAL AND EXCITER CURRENT

(75) Inventors: Albert L. Markunas, Roscoe, IL (US); Dhaval Patel, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 386 days.

(21) Appl. No.: 13/114,595

(22) Filed: May 24, 2011

(65) Prior Publication Data
US 2012/0299515 A1 Nov. 29, 2012

(51) Int. Cl.
*H02P 6/16* (2006.01)
*H02P 1/46* (2006.01)

(52) U.S. Cl.
USPC .............. 318/400.33; 318/712; 318/719

(58) Field of Classification Search
USPC ........ 318/712, 715, 716, 719, 400.32, 400.33
See application file for complete search history.

(56) References Cited

U.S. PATENT DOCUMENTS

| | | |
|---|---|---|
| 5,461,293 A | 10/1995 | Rozman et al. |
| 5,585,709 A | 12/1996 | Jansen et al. |
| 6,788,024 B2 | 9/2004 | Kaneko et al. |
| 6,909,257 B2 | 6/2005 | Inazumi |
| 6,924,617 B2 | 8/2005 | Schulz et al. |
| 6,967,461 B1 | 11/2005 | Markunas et al. |
| 7,026,772 B2 | 4/2006 | Quirion |
| 7,034,497 B2 | 4/2006 | Markunas et al. |
| 7,072,790 B2 | 7/2006 | Hu et al. |
| 7,132,816 B1 | 11/2006 | Markunas et al. |
| 7,466,088 B2 | 12/2008 | Romenesko et al. |
| 7,577,545 B2 | 8/2009 | Hu |
| 7,583,046 B2 | 9/2009 | Maddali et al. |
| 7,745,949 B2 | 6/2010 | Yang et al. |
| 2006/0061319 A1* | 3/2006 | Markunas et al. ............ 318/712 |
| 2008/0315822 A1* | 12/2008 | Maddali et al. ............... 318/700 |
| 2011/0121768 A1* | 5/2011 | Ting et al. ................ 318/400.11 |

* cited by examiner

*Primary Examiner* — Bentsu Ro
(74) *Attorney, Agent, or Firm* — Carlson, Gaskey & Olds P.C.

(57) ABSTRACT

An example method of initiating operation of a wound field synchronous machine in a motoring mode includes estimating an initial position of a rotor of a wound field synchronous machine using a carrier injection sensorless stimulation signal. The method tracks an operating position of the rotor based on current harmonics of the wound field synchronous machine. The method also calibrates the tracking using the initial position.

16 Claims, 3 Drawing Sheets

WOUND FIELD SYNCHRONOUS MACHINE ROTOR TRACKING USING A CARRIER INJECTION SENSORLESS SIGNAL AND EXCITER CURRENT

BACKGROUND

This disclosure relates generally to motor control. More particularly, this disclosure relates to a method of estimating rotor position information for a motor.

Electric motor-generators and wound field synchronous machines ("WFSM") are types of electric machines that are controlled to provide a desired performance. A WFSM is particularly useful for aeronautical applications because the WFSM can selectively operate as a starter (motor) for a turbomachine, and as a generator that is driven by the turbomachine.

The WFSM is typically coupled to a permanent magnet generator. The permanent magnet generator powers an excitation system that provides current to windings of the WFSM when the WFSM is operating in a generate mode. Position information regarding motor components is necessary to achieve accurate control of the WFSM. Various position determination techniques have been proposed.

One known technique of estimating the position of components in the WFSM involves superimposing a carrier voltage signal upon a fundamental control voltage signal. A controller generates the fundamental control signal, which modulates an AC power source that drives the motor to produce rotational torque. As the carrier voltage signal is a relatively high-frequency signal, the carrier voltage signal does not substantially affect the fundamental control signal driving the motor. The technique of estimating the angular position of the rotor is often referred to as the carrier injection sensorless ("CIS") method and is described in U.S. Pat. No. 5,585,709.

The CIS method has proven useful but it has shortcomings. For example, the CIS method may undesirably place an increased current carrying burden on some components. Thus, other techniques have been developed, such as a technique that measures and utilizes current harmonics of an exciter rather than the current harmonics induced by a carrier voltage signal. An example of this technique is described in U.S. Pat. No. 7,132,816. This technique also has shortcomings. For example, this technique is typically useful only for motors having certain numbers of poles and configurations of poles.

There is a need for an improved technique that takes advantage of known control strategies yet provides more reliable position information.

SUMMARY

An example method of initiating operation of a wound field synchronous machine in a motoring mode includes estimating an initial position of a rotor of a wound field synchronous machine using a carrier injection sensorless stimulation signal. The method tracks an operating position of the rotor based on carrier frequency current harmonics of the wound field synchronous machine. The method also calibrates the tracking using the initial estimated position. The carrier frequency current harmonics may be in the main stator of the wound field synchronous machine.

An example method of tracking a rotor of a wound field synchronous machine operating in a motoring mode includes tracking any one of a number of reference positions of the rotor based on current harmonics of the polyphase exciter field of the wound field synchronous machine. The method adjusts the reference position to provide a true position, and the adjusting is based on a carrier injection sensorless signal position estimate. The method controls the fundamental control signal based on the adjusted position.

An electromechanical power transfer system includes a wound field synchronous machine configured to rotatably drive a shaft. The wound field synchronous machine has an associated main machine. An estimator module of the system is configured to estimate an initial position of a rotor of the wound field synchronous machine using a carrier injection sensorless stimulation signal. A tracker module of the system is configured to track an operating position of the rotor based on current harmonics of the wound field synchronous machine. A starter controller of the system is configured to apply a torque producing current to the wound field synchronous machine. The starter controller determines an actual position of the rotor based on position information from the estimator module and the tracker module.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
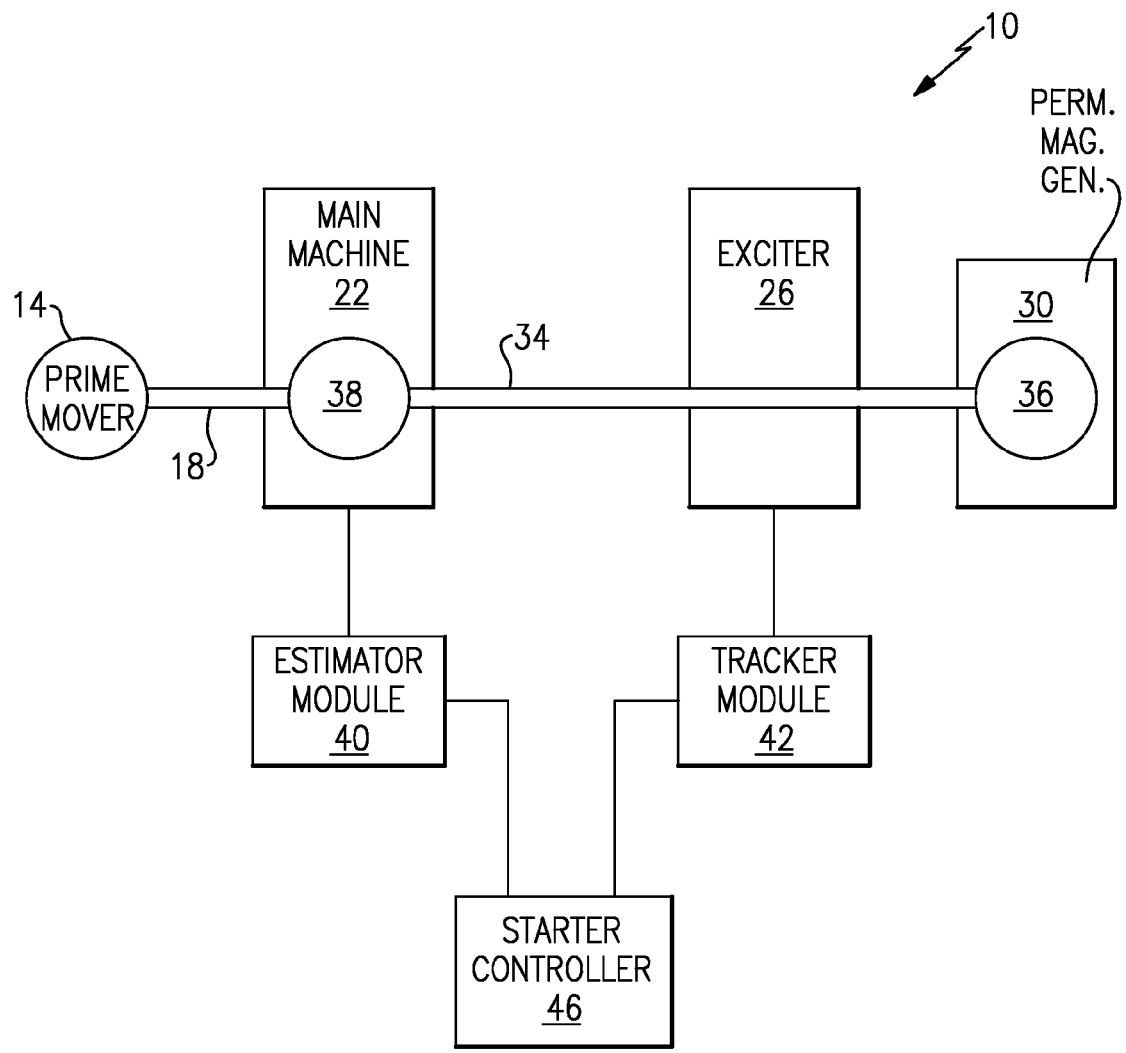
FIG. 1 shows a highly schematic view of an example electromechanical power transfer system.

Referring to FIG. 1, an example brushless wound field synchronous starter generator (WFSM) 10 is configured to rotatably drive a prime mover 14 by rotating a main shaft 18. Although this example shows the single main shaft 18, other examples may include additional shafts.

The prime mover 14 may include one or more gearboxes (not shown). In this example, the prime mover 14 is a gas turbine engine of an aircraft. In another example, the prime mover 14 is another type of device requiring rotation for operation.

The WFSM 10 includes a main machine portion 22, an exciter portion 26, and a permanent magnet generator portion 30 all joined to a coupling shaft 34. The coupling shaft 34 extends from a rotor 36 of the permanent magnet generator portion 30 to a main rotor 38 of the main machine portion 22. The main rotor 38 is the main rotor of the WFSM 10 in this example. As known, the angular position of the main rotor 38 is required to properly orient a current communicating to the main machine 22 relative to the magnetic north pole of the main rotor 38.

This arrangement of the main machine portion 22, the exciter portion 26, and the permanent magnet generator portion 30 is shown for example only. Other arrangements are possible, including configurations where the permanent magnet generator portion 30 is connected via gears to the main shaft 18.

In this example, an arrangement for estimating the angular position of the rotor 38 includes an estimator module 40 and a tracker module 42. A starter controller 46 is operably coupled to the estimator module 40 and the tracker module 42. The starter controller 46 applies a torque producing current to the WFSM 10 in response to information from the estimator module 40 and the tracker module 42. The estimator module 40 is configured to determine an initial position of the rotor 38 during start-up of the WFSM 10, and the tracker module 42 is configured to track the position of the rotor 38 during operation.

Figure 2:
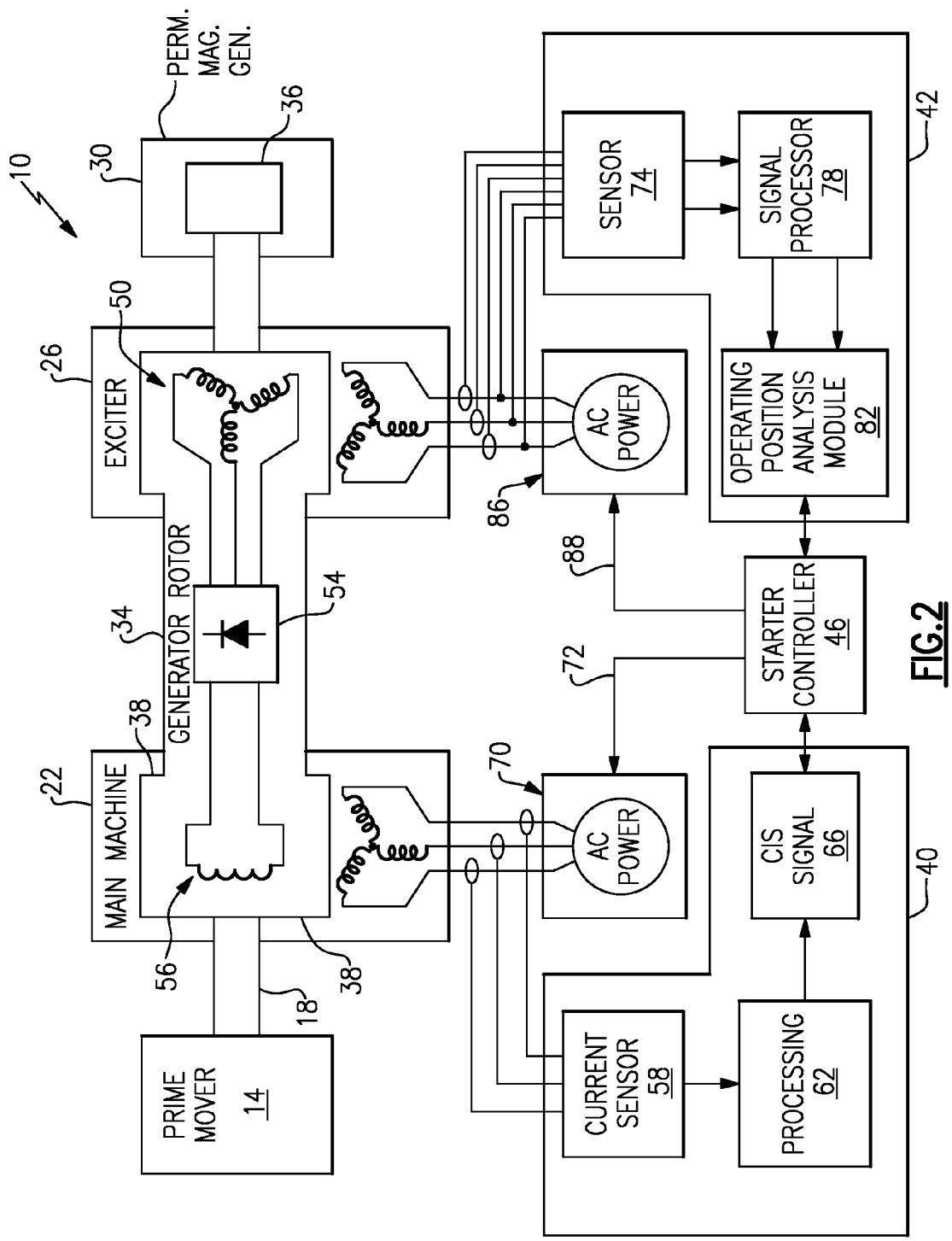
FIG. 2 shows a more detailed schematic view of the FIG. 1 system.

Referring now to the more detailed view of FIG. 2, a polyphase exciter armature 50 of the exciter 26 is configured to transmit polyphase electric power to a rectifier 54, which then provides a DC output to a field 56 of main machine 22. The polyphase exciter is three phase in this example. The DC output provides the excitation power to the main machine 22 that drives the main rotor 38.

The example estimator module 40 includes a current sensor 58, a signal processor 62, and a module that analyzes current harmonics of a carrier injection sensorless ("CIS") signal 66. The example estimator module 40 operates during the initial stages of startup of the rotor 38. The estimator module 40 interrogates the main machine 22 through the stator terminals of the main machine 22 to determine the initial position of the rotor 38 using the CIS technique (which is known). The initial position information is communicated to the starter controller 46.

The starter controller 46 may generate pulse width modulated signals to control an inverter 70 along a path 72. The inverter 70 is associated with the main machine 22 and is an AC power block in this example. As the pulse width modulated signals are communicated to the inverter 70 during an initial position determination (when the WFSM 10 is in the initial stages of a start sequence), signals required to produce starter torque are not yet required.

The tracker module 42 includes a sensor 74, a signal processor 78, and an operating position analysis module 82. In this example, the sensor 74 senses a polyphase AC current and the polyphase AC voltage provided by an AC power block 86 to the exciter 26. The sensor 74 communicates the sensed information to the signal processor 78. The processed signal is then communicated to the operating position module 82 where the processed signal is used to estimate a position of the main rotor 38 during operation of the WFSM 10.

The operating position module 82 communicates the position estimation information to the starter controller 46. The starter controller 46 may generate pulse width modulated signals to control the AC power block 86 along a path 88.

In this example, the tracker module 42 measures and demodulates the current harmonics from a three-phase exciter field of the WFSM 10. Also, in this example, the AC power block 86 is the available 3-phase ac power onboard the aircraft. The AC power block 86 could also function as an inverter for the exciter 26.

In another example, the sensor 74 senses information from an aircraft AC power bus or another source of AC power. In one example, the position is tracked by locking onto a rotor position selected from a plurality of possible rotor positions based on initial position. A person having skill in this art and the benefit of this disclosure would understand how to track a position of the rotor 38 based on the information obtained by the sensor 74.

Notably, the tracker module 42 differs from the estimator module 40 at least because the tracker module 42 estimates the position of the rotor 38 based on current harmonics associated with the exciter 26 rather than the current harmonics of a carrier frequency that is injected into the main machine 22.

In this example, the information provided to the starter controller 46 from the tracker module 42 is calibrated or adjusted based on information received from the estimator module 40. More specifically, the absolute position of the rotor 38 from the estimator module 40 is used to calibrate the rotor position derived from the tracker module 42. Calibrating the position information from the tracker module 42 in this way ensures that the starter controller 46 is able to provide accurate positional information about the rotor 38. As known, the tracker module 42 locks on to the rotor 38 at one of a number of possible positions, which can cause the tracked position to be offset from the absolute rotor position. The possible positions are determined by the number of exciter poles and the architecture of the rectifier 54. The estimator module 40 calibrates the tracker module 42 by determining the difference between the rotor position indicated by the tracker module 42 and the absolute rotor position from the estimator module 40.

Because the example estimator module 40 is only used for calibration, the estimator module 40 may be deactivated after providing the starter controller 46 with the required information. Provided the tracker module 42 maintains a lock on the rotor position estimate, the rotor position estimate from the tracker module 42 will remain accurate.

After calibration, the starter controller 46 controls the main machine 22 and the exciter 26 in the same manner as is known in the art. At a starter generator determined minimum threshold speed, responsibility for determining rotor position may be passed from the tracker module 42 to one of many possible high speed rotor position estimation algorithms.

Figure 3:
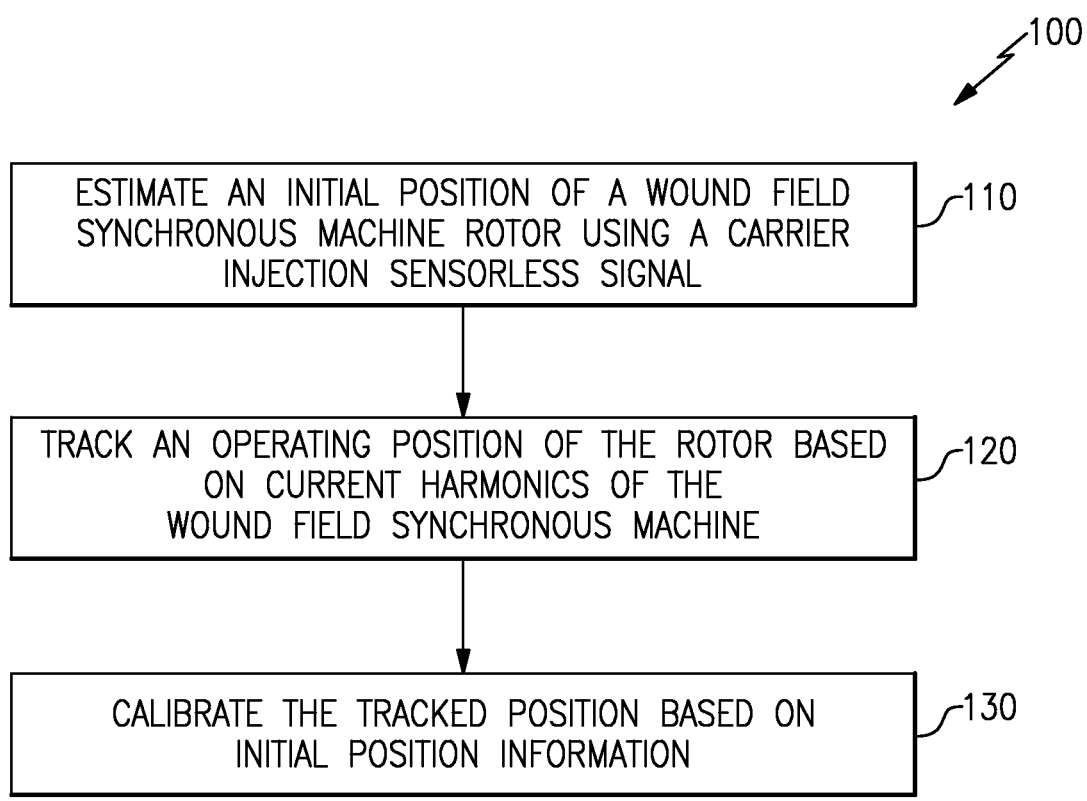
FIG. 3 shows an example method of calibrating the wound field synchronous machine of FIGS. 1 and 2.

Referring to FIG. 3, an example method 100 of initiating operation of a wound field synchronous machine in a motoring mode includes estimating an initial position of a rotor of a wound field synchronous machine using a carrier injection sensorless signal at a step 110. The method 100 then locks on to and tracks an operating position of the rotor based on current harmonics of the wound field synchronous machine at a step 120. The tracking is then calibrated at a step 130 based on initial position information from the step 110.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of initiating operation of a wound field synchronous machine in a motoring mode, comprising:
    estimating an initial position of a rotor of a wound field synchronous machine using a carrier injection sensorless signal;
    tracking an operating position of the rotor based on current harmonics of the wound field synchronous machine; and
    calibrating the tracking using the initial position.

2. The method of claim 1, wherein the estimating the initial position comprises interrogating the wound field synchronous machine through stator terminals of the wound field synchronous machine.

3. The method of claim 1, wherein the current harmonics comprise current harmonics of a polyphase exciter of the wound field synchronous machine.

4. The method of claim 1, wherein the tracking comprises measuring and demodulating the current harmonics in the wound field synchronous machine.

5. The method of claim 1, wherein the tracking comprises locking onto a rotor position that is selected from a plurality of possible rotor positions based on the initial position.

6. The method of claim 5, wherein the plurality of possible rotor positions are determined based on a number of exciter poles in the wound field synchronous machine, an architecture of a rectifier in the wound field synchronous machine, or both.

7. The method of claim 1, including stopping the estimating after the calibrating.

8. The method of claim 1, wherein the rotor is the main rotor of the wound field synchronous machine.

9. A method of tracking a rotor of a wound field synchronous machine operating in a motoring mode, comprising:
   tracking a reference position of a rotor based on current harmonics of the wound field synchronous machine;
   adjusting the reference position to provide an adjusted position, the adjusting based on a carrier injection sensorless signal position estimate; and
   controlling the rotor based on the adjusted position.

10. The method of claim 9, including rotatably driving a turbomachine using the wound field synchronous machine.

11. The method of claim 9, wherein the rotor is the main rotor of the wound field synchronous machine.

12. The method of claim 9, wherein the adjusting comprises calibrating the reference position.

13. The method of claim 9, including stopping the carrier injection sensorless signal after the adjusting.

14. An electromechanical power transfer system, comprising:
   a wound field synchronous machine configured to rotatably drive a shaft, the wound field synchronous machine having an associated main machine;
   an estimator module configured to estimate an initial position of a rotor of the wound field synchronous machine using a carrier injection sensorless signal;
   a tracker module configured to track an operating position of the rotor based on current harmonics of the wound field synchronous machine; and
   a starter controller configured to apply a torque producing current to the wound field synchronous machine, wherein the starter controller determines an actual position of the rotor based on position information from the estimator module and the tracker module.

15. The system of claim 14, wherein the starter controller is configured to calibrate the operating position provided by the tracker module in response to the initial position provided by the estimator module to determine the actual position.

16. The system of claim 14, including a turbomachine that is rotatably driven by the shaft.

* * * * *